United States Patent [19]

Fukada et al.

[11] Patent Number: 5,488,454
[45] Date of Patent: Jan. 30, 1996

[54] CONTROL OF EQUIPMENT AND OF COMMUNICATION WITH PLURAL UNITS OF EQUIPMENT

[75] Inventors: Taisei Fukada, Tokyo; Masanori Miyata, Yokohama; Hideki Adachi; Shinichi Nakamura, both of Kawasaki; Naoyuki Ohki; Tokuharu Kaneko, both of Yokohama; Satoshi Kuroyanagi; Hiroshi Ozaki, both of Tokyo, Japan; Hisatsugu Tahara; Satoshi Kaneko, both of Kawasaki; Mitsuharu Takizawa, Tokyo, all of Japan

[73] Assignee: Canon Kabushiki Kaisha, Tokyo, Japan

[21] Appl. No.: 305,820

[22] Filed: Sep. 14, 1994

Related U.S. Application Data

[63] Continuation of Ser. No. 212,387, Mar. 14, 1994, abandoned, which is a continuation of Ser. No. 868,342, Apr. 15, 1992, abandoned.

[30] Foreign Application Priority Data

Apr. 18, 1991 [JP] Japan .................... 3-085605
Apr. 18, 1991 [JP] Japan .................... 3-085614
Apr. 18, 1991 [JP] Japan .................... 3-085617

[51] Int. Cl.[6] .................................. G03G 15/00
[52] U.S. Cl. .................. 355/202; 364/138; 395/113; 395/114; 395/183.01
[58] Field of Search ................. 355/202, 204–207; 358/400, 437; 395/113, 1114, 115, 575; 371/16.4; 364/138; 379/100, 106

[56] References Cited

U.S. PATENT DOCUMENTS

| | | | |
|---|---|---|---|
| 3,305,839 | 2/1967 | Looschen et al. | 340/172.5 |
| 3,623,013 | 11/1991 | Perkins et al. | 340/172.5 |
| 3,638,191 | 1/1972 | Mann | 340/163 |
| 3,656,145 | 4/1972 | Proops | 340/310 |
| 3,842,408 | 10/1974 | Wells | 340/216 |
| 3,858,181 | 12/1974 | Goldsby et al. | 340/150 |
| 3,916,177 | 10/1975 | Greenwald | 235/153 |
| 3,967,248 | 6/1976 | Kjöller et al. | 340/172.5 |
| 3,984,032 | 10/1976 | Hyde et al. | 222/26 |

(List continued on next page.)

FOREIGN PATENT DOCUMENTS

| | | |
|---|---|---|
| 0121332 | 10/1984 | European Pat. Off. . |
| 0342910 | 11/1989 | European Pat. Off. . |
| 2254854 | 7/1975 | France . |
| 54-21845 | 2/1979 | Japan .................... 355/207 |
| 56-27161 | 3/1981 | Japan . |
| 59-22475 | 2/1984 | Japan . |
| 59-91456 | 5/1984 | Japan . |
| 59-89067 | 5/1984 | Japan . |
| 59-81656 | 5/1984 | Japan . |
| 59-116761 | 11/1984 | Japan . |
| 60-101664 | 6/1985 | Japan . |
| 60-230167 | 11/1985 | Japan . |
| 62-84653 | 4/1987 | Japan . |
| 63-2034 | 1/1988 | Japan .................... 355/204 |
| 63-122349 | 5/1988 | Japan . |
| 2-223963 | 9/1990 | Japan .................... 355/204 |
| 9213295 | 8/1992 | WIPO . |

OTHER PUBLICATIONS

Xerox 1090 Copier Electronic Data Interface Operator Guide (No Date).
Kodak Ektaprint Brochure, Copyright, Eastman Kodak Company, 1986.

*Primary Examiner*—Joan H. Pendegrass
*Attorney, Agent, or Firm*—Fitzpatrick, Cella, Harper & Scinto

[57] ABSTRACT

An equipment control unit is composed of equipment control means for controlling the operation of an equipment, communication control means for controlling the transmission and reception of data to and from an external device, and transfer means for transferring the data between the equipment control means and the communication control means.

38 Claims, 13 Drawing Sheets

U.S. PATENT DOCUMENTS

| | | | |
|---|---|---|---|
| 3,997,873 | 12/1976 | Thornton | 340/149 R |
| 4,071,911 | 1/1978 | Mazur | 364/200 |
| 4,124,887 | 11/1978 | Johnson et al. | 364/107 |
| 4,144,550 | 3/1979 | Donohue et al. | 364/107 |
| 4,167,322 | 9/1979 | Yano et al. | 355/3 R |
| 4,188,668 | 2/1980 | Finlay | 364/900 |
| 4,199,100 | 4/1980 | Wostl et al. | 235/381 |
| 4,283,709 | 8/1981 | Lucero et al. | 340/147 R |
| 4,290,138 | 9/1981 | Bare et al. | 371/29 |
| 4,300,040 | 11/1981 | Gould et al. | 235/381 |
| 4,311,986 | 1/1982 | Yee | 340/825.63 |
| 4,312,066 | 1/1982 | Bantz et al. | 371/16 |
| 4,314,334 | 2/1982 | Daughton et al. | 364/200 |
| 4,358,756 | 11/1982 | Morel et al. | 340/539 |
| 4,369,442 | 1/1983 | Werth et al. | 340/825.35 |
| 4,405,951 | 9/1983 | Omori et al. | 358/400 |
| 4,432,090 | 2/1984 | da Silva | 371/32 |
| 4,455,453 | 6/1984 | Parasekvakos et al. | 179/2 |
| 4,456,790 | 6/1984 | Soyack | 179/18 ES |
| 4,477,901 | 10/1984 | Braband et al. | 371/15 |
| 4,496,237 | 1/1985 | Schron | 355/14 C |
| 4,497,037 | 1/1985 | Kato et al. | 364/900 |
| 4,501,485 | 2/1985 | Tsudaka | 355/6 |
| 4,506,974 | 3/1985 | Sugiura et al. | 355/14 R |
| 4,509,851 | 4/1985 | Ippolito et al. | 355/14 C |
| 4,510,491 | 4/1985 | Prato | 340/792 |
| 4,523,299 | 6/1985 | Donohue et al. | 364/900 |
| 4,545,013 | 10/1985 | Lyon et al. | 364/200 |
| 4,549,044 | 10/1985 | Durham | 179/5 R |
| 4,574,283 | 3/1986 | Arakawa et al. | 340/825.08 |
| 4,578,538 | 3/1986 | Pascucci et al. | 179/2 DP |
| 4,583,834 | 4/1986 | Seko et al. | 355/206 |
| 4,595,921 | 6/1986 | Wang et al. | 340/825 |
| 4,611,205 | 9/1986 | Eglise | 340/825 |
| 4,630,042 | 12/1986 | Kawasaki et al. | 340/825 |
| 4,633,412 | 12/1986 | Ebert, Jr. et al. | 364/493 |
| 4,634,258 | 1/1987 | Tanaka et al. | 355/4 |
| 4,639,889 | 1/1987 | Matsumoto et al. | 364/900 |
| 4,652,698 | 3/1987 | Hale et al. | 380/24 |
| 4,654,800 | 3/1987 | Hayashi et al. | 364/479 |
| 4,658,243 | 4/1987 | Kimura et al. | 340/505 |
| 4,708,469 | 11/1987 | Bober et al. | 355/77 |
| 4,709,149 | 11/1987 | Takahashi et al. | 250/317 |
| 4,712,213 | 12/1987 | Warwick et al. | 371/15 |
| 4,723,212 | 2/1988 | Mindrum et al. | 364/401 |
| 4,742,483 | 5/1988 | Morrell | 364/900 |
| 4,745,602 | 5/1988 | Morrell | 371/20 |
| 4,752,950 | 7/1988 | Le Carpentier | 379/106 |
| 4,760,330 | 7/1988 | Lias, Jr. | 324/73 R |
| 4,766,548 | 8/1988 | Cedrone et al. | 364/479 |
| 4,792,910 | 12/1988 | Lange | 395/115 |
| 4,823,343 | 4/1989 | Takahashi | 371/16 |
| 4,845,483 | 7/1989 | Negishi | 340/824 |
| 4,916,607 | 4/1990 | Teraichi et al. | 364/200 |
| 4,947,397 | 8/1990 | Sobel et al. | 371/16.4 |
| 4,962,368 | 10/1990 | Dobrzanski et al. | 340/514 |
| 4,991,114 | 2/1991 | Kawamura et al. | 364/519 |
| 5,057,866 | 10/1991 | Hill, Jr. et al. | 355/200 |
| 5,077,582 | 12/1991 | Kravette et al. | 355/206 |
| 5,084,875 | 1/1992 | Weinberger et al. | 371/291 |
| 5,131,077 | 7/1992 | Indei | 395/113 |
| 5,138,618 | 8/1992 | Honda et al. | 371/16.4 |
| 5,214,772 | 5/1993 | Weinberger et al. | 395/575 |

CONTROL OF EQUIPMENT AND OF COMMUNICATION WITH PLURAL UNITS OF EQUIPMENT

This application is a continuation of application Ser. No. 08/212,387 filed Mar. 14, 1994, now abandoned, which is a continuation of application Ser. No. 07/868,342 filed Apr. 15, 1992, which is now abandoned.

BACKGROUND OF THE INVENTION

1. Field of the Invention

The present invention relates to an equipment control unit for transmitting stored control information of an equipment to an external centralized control system.

2. Related Background Art

There is a strong desire for a copying apparatus having more additional and higher functions, resulting in a copying apparatus that is increasingly more complex in its construction and functions. Also, the number of copying apparatuses installed within one company is increasing. Thus, as described in U.S. Pat. No. 5,084,875, it is well known that in order to make the management of use and operation, the maintenance, and the appropriate and rapid repair for fault, the normal use conditions and the functional data of the copying apparatus are collected by a management department within the company or a special dealer for the centralized control.

Therefore, the copying apparatus was constituted such that a copy controller was also used to make the communication control with the external line, or a dedicated communication controller was provided to communicate with an external device for the centralized control, in place of the copy controller, by directly reading or writing the data from a storage portion for storing the data necessary for the copy control in the copy controller.

However, in an apparatus with the copy controller used to make the communication control, there was a problem that the communication speed with the external line might decrease due to an overhead of the copy controller. In an apparatus with the dedicated communication controller, there was a problem that due to a complex constitution thereof, it was difficult to cope with a plurality of communication methods in the communication partner.

Also, it is well known that by calling out a specific external device with, for example, a telephone number to make the communication through a communication line, the transmission or reception of data can be made to the external device installed at the management department and the like.

Such a copying apparatus controlled the copying operation while referring to a copy control storage which stored the information necessary for controlling the copying operation, and controlled the communication while referring to a communication control storage which stored the information necessary for controlling the communication.

However, in such a copying apparatus, if the storage portion failed for some reason, the copying operation or the communication operation might be interrupted, so that the user could not make the copy or the communication until the serviceman had repaired the failed copying apparatus.

Even with a copying apparatus having a plurality of storage portions in the controller, there was a problem that when a failure occurred within the controller, any storage portion might possibly not be accessed.

Also, there is provided a storage portion in the copying apparatus in which in order to prestore the normal functional data to be easily available and referred to by the service or maintenance person in charge at the failure or periodical maintenance service, the use or functional data of the copying apparatus can be stored by manual input, or automatic input with a controller of the copying apparatus.

However, in such copying apparatus, when a failure occurred in a controller having the storage portion for storing the information data associated with the copying apparatus, except in the storage portion, the controller integral with the storage portion was exchanged, wherein it was necessary for the serviceman to write a plurality of information associated with the copying apparatus on a memo sheet, then exchange the controller, and again manually input the whole information with reference to the memo sheet, which was a laborious and time-consuming task. Also, there was a problem that when the important information was input wrongly in inputting the information, the reliability of the copying apparatus might be significantly decreased.

SUMMARY OF THE INVENTION

An object of the present invention is to provide an equipment control unit which has overcome the above-mentioned problems.

Also, it is another object of the invention to provide an improved equipment control unit.

Also, it is another object of the invention to provide an equipment control unit which allows communication with an external device, without restriction of the data transfer timing or speed in a controller of an equipment, so that the communication speed may not decrease even at the time of increased overhead in the controller of the equipment during the operation of the equipment.

It is another object of the present invention to provide an equipment control unit in which the operation or communication of an equipment can be practiced without any troubles even when the abnormality occurs in a storage portion for storing the information of the equipment, and the stored contents of the storage portion can be readily restored to allow a rapid restart of the operation, when either an equipment controller or a communication controller may fail.

It is another object of the present invention to provide an equipment control unit which does not require any troublesome manual work such as the writing and re-entry of equipment data by the serviceman, when a controller is necessary to exchange.

According to one aspect of the invention, these objects are attained by providing a communication control unit comprising means for bidirectionally transferring data between an equipment control unit and the communication control unit, means for bidirectionally communicating the data between an external device and the communication control unit, and means for performing reception of data from the equipment control unit through the transfer means in response to a reception request, performing transmission of the data received through the transfer means to the external device through the communication means in response to a transmission request, performing reception of data from the external device through the communication means in response to a reception request, and performing transmission of data received through the communication means to the equipment control unit through the transfer means in accordance with whether transmission is possible.

According to another aspect of the invention, the objects are achieved by providing a communication control apparatus comprising means for storing data, and means for performing communication between an equipment control apparatus and an external apparatus, wherein the communication means receives control data for controlling the equipment control apparatus from the equipment control apparatus, and the storage means stores the received control data.

According to another aspect of the invention, the objects are achieved by providing an equipment control apparatus comprising means for controlling a piece of equipment, means for storing data, and means for performing communication with a communication control apparatus for performing communication between said equipment control apparatus and an external apparatus, wherein the communication means receives control data for controlling the communication control apparatus, and the storage means stores the received control data.

Other objects and characteristics of the present invention will be even clearer from the following description and the drawings.

DETAILED DESCRIPTION OF THE PREFERRED EMBODIMENTS

A copying apparatus according to the present invention will be described below.

Figure 1:
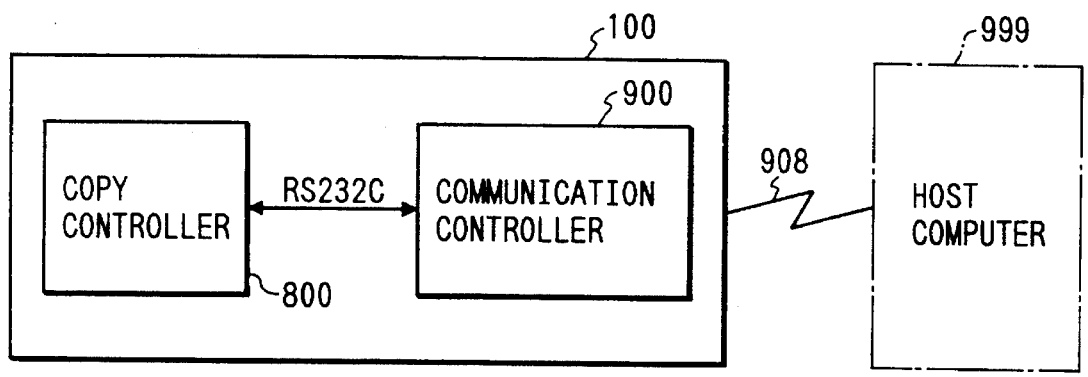
FIG. 1 is a block diagram showing a schematic configuration of the present invention.

FIG. 1 is a block diagram showing the configuration of the copying apparatus in one embodiment.

100 is a copying apparatus main component (body), 800 is a copy controller for controlling the copying operation, 900 is a communication controller (modem board) for bidirectionally transmitting or receiving the data through an external communication line, 908 is a public line which is the external communication line, and 999 is a host computer system which is an external device placed at a control section to control the copying apparatus 100.

Figure 2:
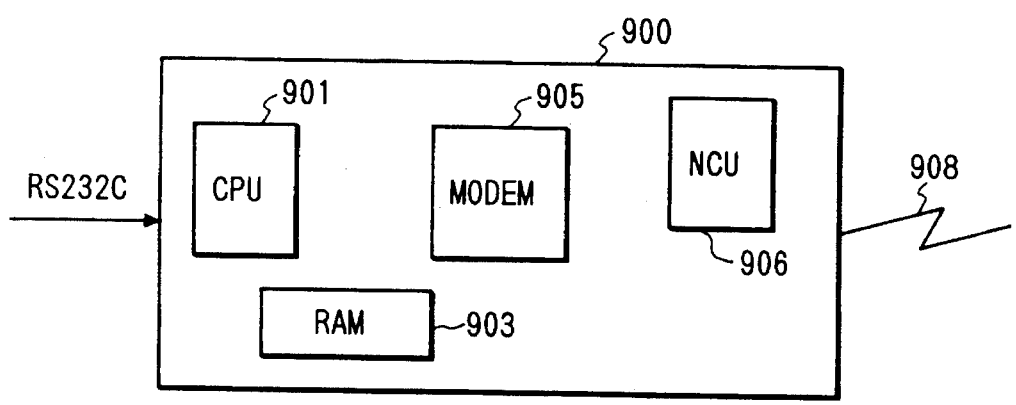
FIG. 2 is a configuration diagram of a communication controller 900.

FIG. 2 is a block diagram showing a main configuration of the communication controller 900.

901 is a central processing unit (hereinafter referred to as CPU) for controlling the communication, 903 is a random access memory (RAM) for storing temporarily the communication data, 905 is a modulator/demodulator (MODEM) for modulating the digital communication data to be sent through the public line 908, and for demodulating the data sent through the public line 908 into the digital communication data, and 906 is a network control unit (NCU).

The copy controller 800 and the communication controller 900 with the above constitution allow control for the copying operation of the copying apparatus 100, the storage of data, and the communication with the external device 999 via the external communication line 908.

The copy controller 800 and the communication controller 900 will be described below.

Figure 3:
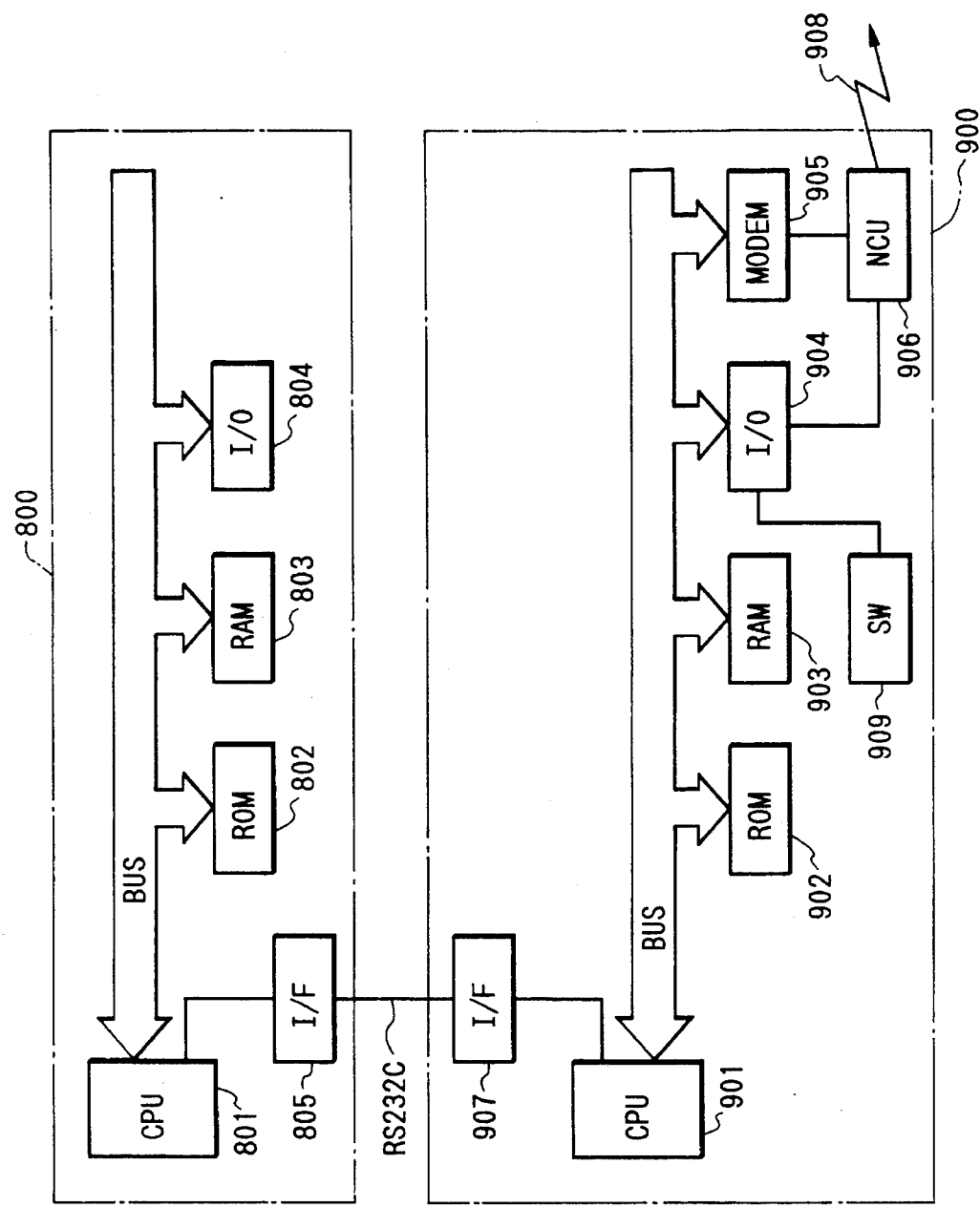
FIG. 3 is a block diagram of a copy controller 800 and the communication controller 900.

FIG. 3 is a block diagram showing the copy controller 800 and the communication controller 900.

801 is a central processing unit (hereinafter referred to as CPU) for controlling the whole copying apparatus, and 802 is a read-only memory (hereinafter referred to as ROM) for storing a control procedure (control program) of the copying apparatus main component 100, CPU 801 being able to control each component connected via a bus for bidirectional communication of information in accordance with the control procedure stored in the ROM 802.

803 is a random access memory (hereinafter referred to as RAM) which is a main storage useful for storing the input data, or as a working storage area, in which a telephone number necessary for starting the communication with the external device 999 is stored. Note that the RAM 803 stores a plurality of types of data to be transmitted to the external device 999.

804 is an input/output IC (hereinafter referred to as I/O) for outputting a control signal of the CPU 801 to a load such as a main motor 113 and inputting a signal from a sensor for a fixing unit and sending it to the CPU 801.

The communication controller 900 for controlling the communication through the external communication line 908 is controlled by a CPU 901 provided internally. 902 is a read-only memory (ROM) for storing the communication control and connection procedure programs. And the copy controller 800 and the communication controller 900 of the copying apparatus main component 100 are connected via the RS-232C interfaces 805, 907, and if the data is transferred from the copy controller 800 of the copying apparatus main component 100 via the RS-232C interface 907, its transferred data is temporarily stored in the RAM 903 provided in the communication controller 900, and after the data transfer from the copy controller 800 has been completed, the CPU 901 controls the NCU 906 to connect the communication line with the external device 999, and transfers the data to the external through the modem 905 and the NCU 906 after the line connection.

Also, when the data transfer is made from the external device 999, its transfer data is temporarily stored in the RAM 903, and then transferred to the copy controller 800 via the RS-232C interfaces 805, 907 upon a request from the copy controller 800.

909 is a switch for setting the telephone number, its own ID number and the password, which is, for example, a rotary switch.

Figure 4:
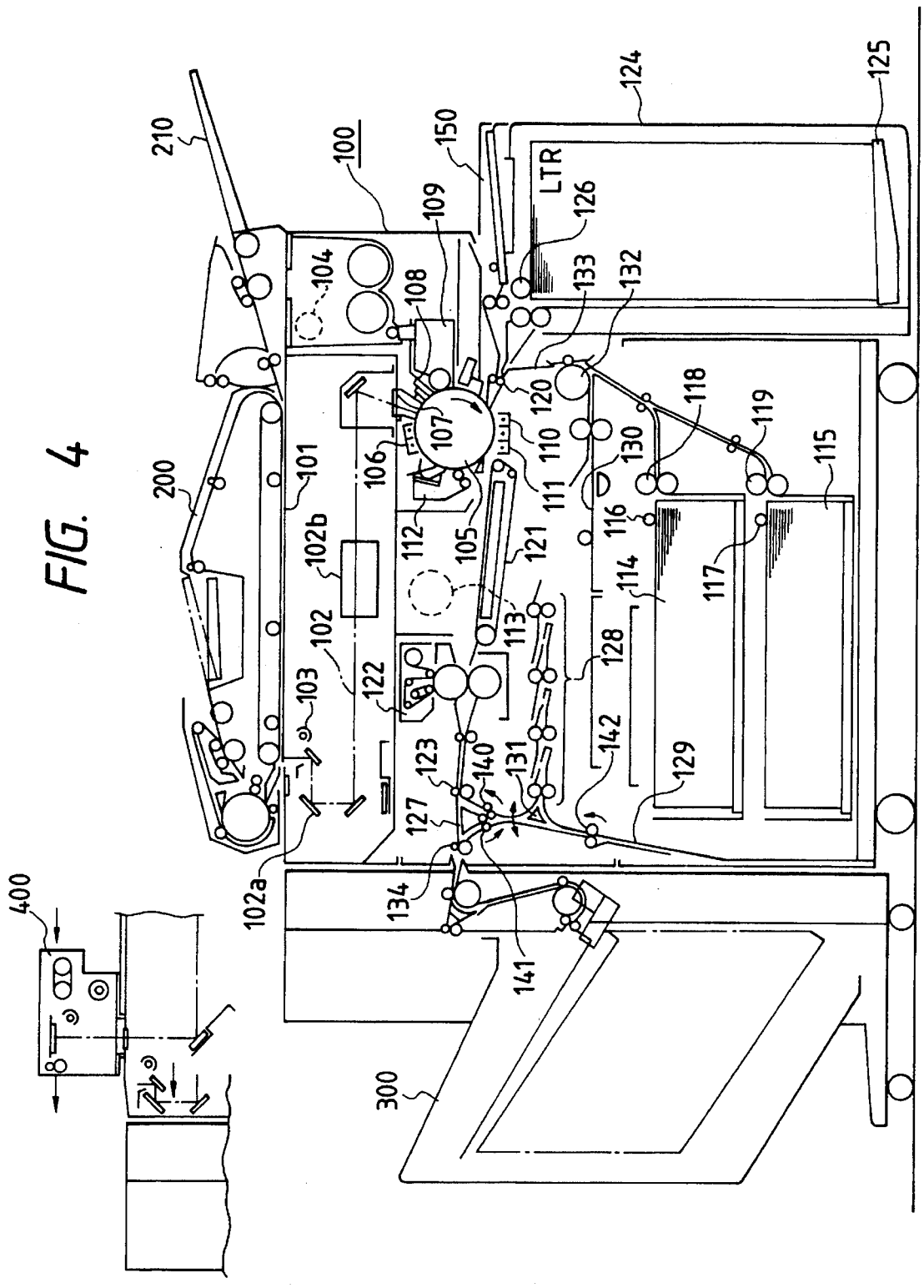
FIG. 4 is a cross-sectional view of a copying apparatus in one embodiment.

FIG. 4 is a cross-sectional view showing the constitution of the copying apparatus 100, of which the constitution and operation will be described with reference to the same figure.

100 is a copying apparatus main component, 200 is a repeatable automatic original feeder (hereinafter referred to as RDF) for automatically feeding an original, 300 is a sorter for sorting copied papers, 400 is an automatic computer form feeder (hereinafter referred to as CFF), in which the RDF 200, the sorter 300 and the CFF 400 as above mentioned may be used in any combination for the copying apparatus main component 100.

The constitution of the copying apparatus main component 100 will be described below.

In FIG. 4, 101 is an original board glass on which an original is laid. 102 is an optical system for reading the original, composed of an exposure lamp 103 for illuminating the original, a scanning mirror 102a, a lens 102b, and a motor 104. The original is illuminated by the exposure lamp 103, while the scanning mirror 102a, the lens 102b and the exposure lamp 103 are moved by the motor 104, and the reflected light from the original is led via the scanning mirror 102a and the lens 102b to a photosensitive drum 105.

Around the photosensitive drum 105, there are mounted a high voltage unit 106, a blank exposure unit 107, a voltage sensor 108, a developing processor 109, a transfer charger 110, a separation charger 111, and a cleaner 112, with which the photosensitive drum 105 can perform the image recording on a fed paper.

The photosensitive drum 105, which rotates in a direction of the arrow by a main motor 113, is corona charged with the high voltage unit 106, and if the reflected light from the original is applied through the optical unit 102, an electrostatic latent image is formed thereon. This electrostatic latent image is developed by the developing processor 109, and visualized as a toner image.

On the other hand, a transfer paper fed into the main component 100 by paper feed rollers 118, 119 after being separated from an upper cassette 114 or a lower cassette 115 by pickup rollers 116,117 is timed by a resist roller 120 so that a leading edge of the toner image on the photosensitive drum 105 and a leading edge of the transfer paper may coincide, and then fed toward the photosensitive drum 105, so that the toner image on the photosensitive drum 105 can be transferred to the transfer paper with the aid of the transfer charger 110. After this transfer, the transfer paper is separated from the photosensitive drum 105 by the separation charger 122 to be conveyed via a conveying belt 121 to a fixing unit 122, against which it is pressed and heated for fixing the toner image, and then exhausted out of the copying apparatus main component 100 by an exhaust roller 123. Also, the photosensitive drum 105 is cleaned on its surface by the cleaner 112.

The copying apparatus main component 100 is equipped with a deck 124 capable of accommodating as many as 4,000 sheets of transfer papers, for example. A lifter 125 of the deck 124 lifts in accordance with the amount of transfer papers so that the transfer paper always makes contact with the paper feed roller 126.

The transfer paper fed out of the exhaust roller 123 is led to either of the both face recording or multi recording side and the exhaust side by a paper exhaust flapper 127. Also, 128 is a lower conveying path for leading the transfer paper fed out of the exhaust roller 123, turned upside down via a reversal path, to a paper refeed tray 130.

131 is a multi flapper for switching the passages for two-sided recording and multi recording, and if this is turned left, the transfer paper is directly led to the lower conveying path 128, rather than the reversal path 129. 132 is a paper feed roller for feeding the transfer paper through a passage 133 to the photosensitive drum 105. 134 is an exhaust roller, disposed near the paper exhaust flapper 127, for exhausting the transfer paper out of the apparatus as the paper exhaust flapper 127 is switched to the exhaust side.

When making the two-sided recording (two-sided copying) and the multi recording (multi copying), the paper exhaust flapper 127 is turned upward to store the copied transfer paper turned upside down via the reversal path 129 and the lower conveying path 128 into the paper refeed tray 130. At this time, the multi flapper 131 is turned right for two sided recording, and left for multi recording. At the back face recording or the multi recording, which is performed next, the transfer paper stored in the paper refeed tray 130 is led through the passage 133 via the paper feed roller 132 to the resist roller 120, one sheet at a time from the bottom side.

When the transfer paper is exhausted in a reversed form out of the copying apparatus main component 100, the paper exhaust flapper 127 is raised upward, and the flapper 131 is turned right, in which the copied transfer paper is fed to the conveying path 129 side to be conveyed to the second feed roller 141 side by a reversal roller 142 after a trailing edge of the transfer paper has passed through the first feed roller 140, and exhausted out of the apparatus by the exhaust roller 134, with the transfer paper turned upside down.

Next, an operation panel will be described below.

Figure 5:
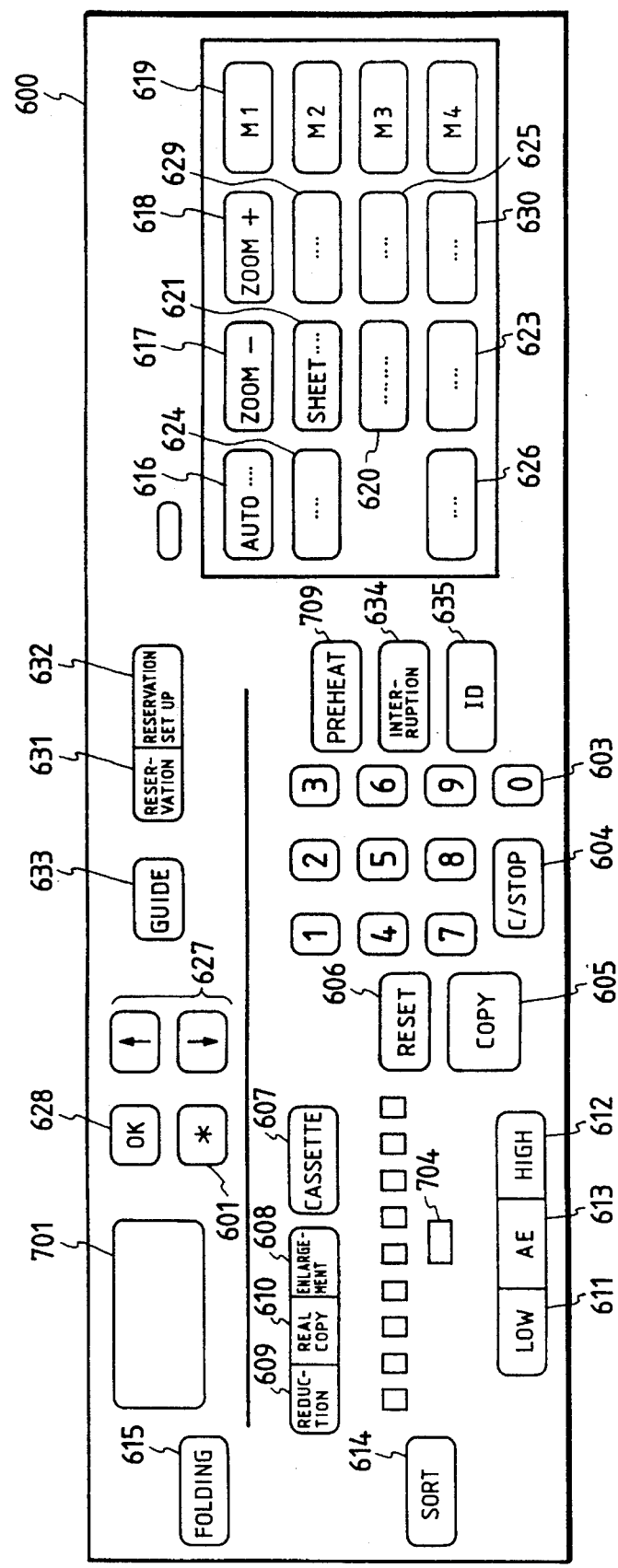
FIG. 5 is an appearance view of an operation panel in the embodiment.

FIG. 5 is an external view showing an example of the operation panel 600 equipped in the copying apparatus main component 100.

601 is an asterisk (*) key which is used by the operator (user) in a setting mode for setting the amount of binding margin or the size of original border erasing. 627 is a cursor key for use in selecting the set items in the setting mode. 628 is an OK key for use in determining the set contents in the setting mode.

606 is an automatic reset key which is depressed to return to a normal mode. This automatic reset key 606 is also depressed when returning from an automatic shut-off state to the normal mode.

605 is a copy start key which is depressed to start the copy.

604 is a clear/stop key having a feature of the clear key during the wait (standby) and the stop key during the copying. This clear/stop key 604 is depressed to clear the set number of copied sheets or stop the continuous coping. And after the copy executed at the time of depressing is terminated, the copying operation is stopped.

603 is a ten key pad which is depressed to set the number of copied sheets. Also, it is used to set the asterisk (*) mode. 619 is a memory key which allows the registration of the mode frequently used by the user. Here, four modes of M1 to M4 can be registered.

611 and 612 are copy density keys which are depressed to adjust the copy density manually. 613 is an AE key which is depressed to adjust automatically the copy density in accordance with the density of an original, or switch the density adjustment to a manual mode by clearing the AE (automatic exposure) mode.

607 is a copy paper selection key which is depressed to select an upper stage paper lifter 119, a lower stage paper lifter 115, a paper deck 124, and a multi manual insertion 150. When the original is laid on the RDF 300, APS (automatic paper cassette selection) can be selected by the copy paper selection key 607. When the APS is selected, the cassette having the same size as the original is automatically selected.

610 is a real copy key which is depressed to copy at the equal magnification (original size). 616 is an automatic variable magnification key which is depressed to specify the automatic reduction or enlargement of the original image in accordance with the size of specified transfer paper.

626 is a both face key which is depressed to make two-sided copies from the one-sided original, two-sided copies from a two-sided original, or a one-sided copy from a two-sided original. 625 is a binding margin key with which a binding margin having a specified length can be created on the left side of the transfer paper. 624 is a photograph key which is depressed to copy the photograph original. 623 is a multi key which is depressed to create (synthesize) images from two originals on the same side of the transfer paper.

620 is an original border erasing key which is depressed to erase a border for the original of fixed size, which is set by the asterisk key 601. 621 is a sheet border erasing key which is depressed to erase the border of the original in accordance with the size of a copy paper.

629 is a cover mode setting key which is used to create a front cover and a back cover, and to insert the fly leaf. 630 is a page continuous copy key which is used to continuously copy the left and right sides of an opened book.

614 is a paper exhaust method selection key for selecting the method of exhausting the paper among the stable sort, sort and group modes, in which when a stable sorter 300 is connected, it is possible to select a stable sort mode, a sort mode or a group mode for a recording sheet, or clear the selection mode.

631 is a reservation key which is used to start the setting of the copy mode for a reserved original laid on a reservation tray 210, or clear the reservation setting. 632 is a reservation setting key which is used as a deterministic key in setting the reservation mode.

633 is a guide key which is used to display a message for explaining the function corresponding to each key on a message display 701.

701 is the message display for displaying the information as to the copy and the communication, which is a liquid crystal display (LCD) for displaying a character or figure with 96×129 dots. For example, it displays the number of copied sheets set by the ten key pad 603, the copy magnification set by the fixed form variable magnification keys 608, 609, the real copy key 610, or the zoom keys 617, 618, the sheet size selected by the copy sheet selection key 607, a message indicating the condition of the copy apparatus main component 100, a guide message indicating the operation procedure, and the set contents in a variety of modes.

704 is an AE indicator which lights up when the AE (automatic exposure) is selected by the AE key 613. 709 is a preheat indicator which lights up in a preheat condition.

When the RDF 200 is used in the normal mode, the setting is such that the copy sheet number is one, with the density of AE mode, the automatic sheet selection, the equal magnification and the one-side copy from the one-side original.

When the RDF 200 is not used in the normal mode, the setting is such that the copy sheet number is one, with the density of manual mode, the equal magnification and the one-side copy from the one-side original. A difference between when the RDF 200 is used and when it is not used can be determined depending on whether the original is set on the RDF 200 or not.

The characteristic communication with the external device will be described below.

Figure 6:
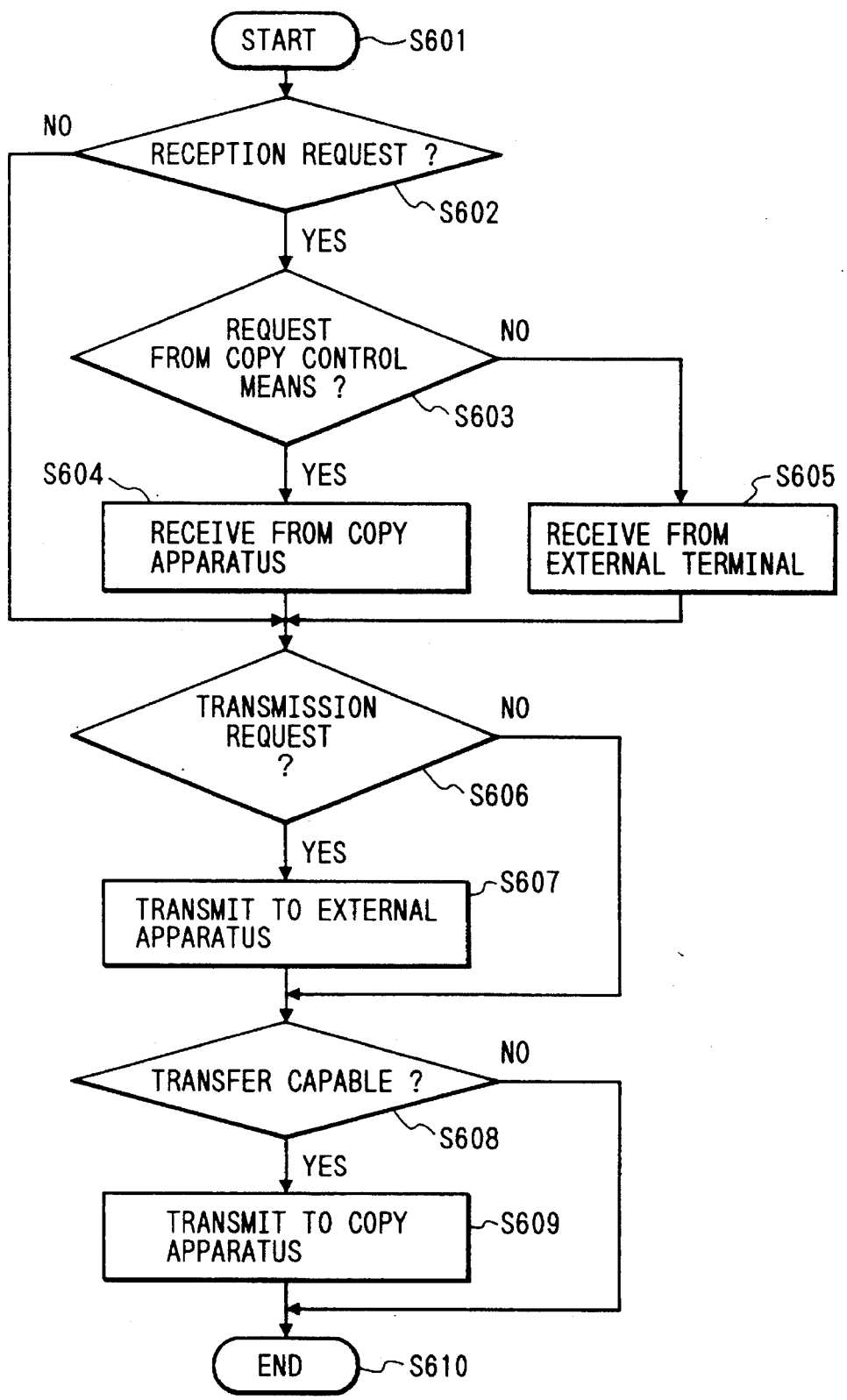
FIG. 6 is a communication control flow chart of the communication controller.

FIG. 6 is a flow chart of a communication control routine which constitutes a part of the program contained in the ROM 902 of the communication controller 900.

At step S601, this routine is entered. At step S602, a check is made to determine whether there is a reception request from the external line or the copying apparatus main component. If there is no reception request, the operation proceeds to step S606. If there is any reception request, a determination is made at step S603 whether the request is one from the external device 999 or the copy controller 800. The operation proceeds to step S604 if the request is from the copy controller 800, or to step S605 if it is from the external device 999, each received data being stored in the RAM 903.

At step S606, a check is made to determine whether there is any transmission request to the external line. The operation proceeds to step S608 if there is no request, or otherwise to step S607, where the external line is connected and the data stored in the RAM 903 is transmitted to the external device 999. Next, at step S608, a check is made to determine whether the transfer to the copy controller 800 is capable. The operation exits this routine at step S610 if it is incapable, or proceeds to step S609 if it is transferable, where the data stored in the RAM 903 is transferred to the copy controller 800, and the operation exits this routine at step S610.

Figure 7:
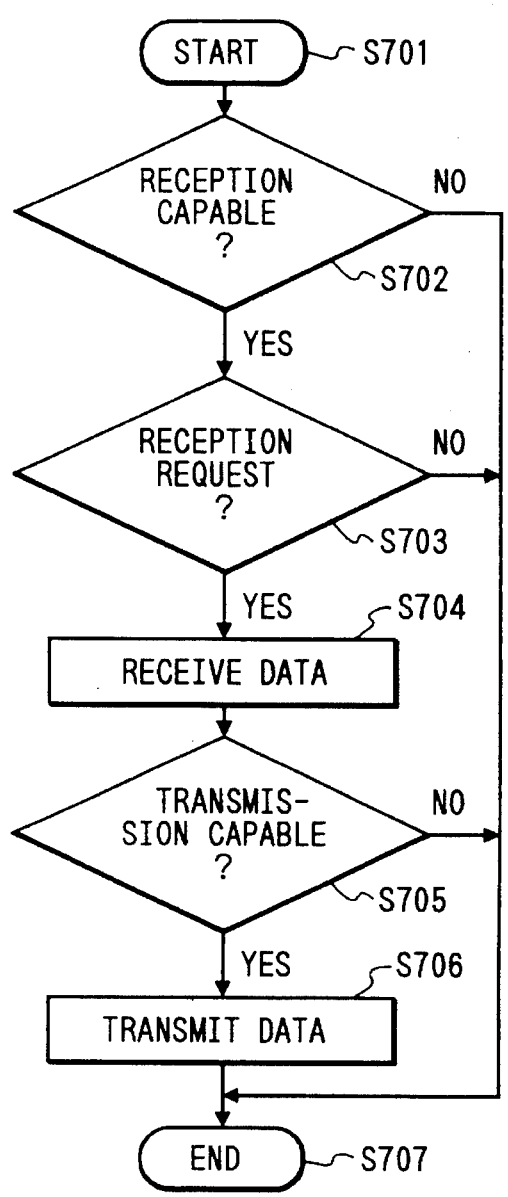
FIG. 7 is a transfer control flow chart of the copy controller.

FIG. 7 is a flow chart of a communication control routine which constitutes a part of the program contained in the RAM 802 of the copy controller 800 in the copying apparatus main component.

At step S701, this routine is entered. At step S702, a check is made to determine whether the copy controller 800 is capable of receiving the data transferred from the communication controller 900. The operation exits this routine at step S707 if reception is not possible, or otherwise proceeds to step S703, where a check is made to determine whether there is any reception request from the communication controller 900. The operation proceeds to step S707 if there is no request, or otherwise to step S704, where transferred data is received. At step S705, a check is made to determine whether the transmission to the communication controller 900 is capable. The operation proceeds to step S707 if the transmission is incapable, or otherwise to step S706, where the transmission is made to the communication controller 900, and the operation exits this routine at step S707.

Figure 8:
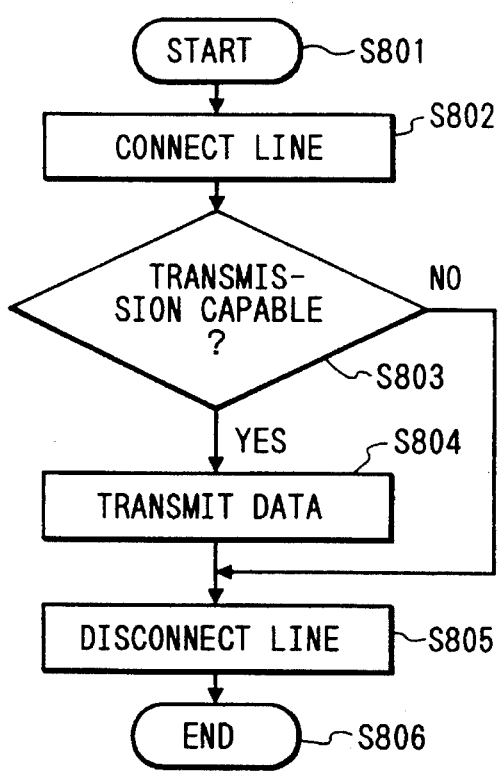
FIG. 8 is a communication control flow chart of an external device.

FIG. 8 is a flow chart showing schematically a communication control routine for the external device 999 of a communication partner.

At step S801, this routine is entered. At step S802, the communication line 908 is connected. At step S803, a check is made to determine whether the communication controller 900 of the copying apparatus is capable of transmission. The operation proceeds to step S805 if it is not capable of transmission, or otherwise to step S804, where the data is transmitted. At step S805, the communication line is disconnected, and at step S806, the operation exits this routine.

In this way, it is possible to make the copying operation under the control of copy control means, and to transmit or receive the data by connecting the communication line to the external device installed at the management department with communication control means.

The communication data is transferred between the copy control means and the communication control means with transfer means, and can be transmitted to the external device after it is once stored in dedicated communication data storing means, or transferred to the copy control means.

With the above constitution and action, it is unnecessary that the transmission to the external device is made at the same time with the data transfer of the copy control means, and synchronized with the transfer from the copy control means, whereby the communication start time and the communication speed can be determined independently of the copy control means. And it is sufficient that the transmission is made after the completion of the transfer, when the CPU for the copy control means has a large overhead, for example, during the copy operation, so that the communication speed may not decrease.

With the copy control means and the communication control means provided separately, it is possible to cope with a variety of communication methods only with the exchange of communication control means.

The copy controller 800 and the communication controller 900 in this example will be described below.

Figure 9:
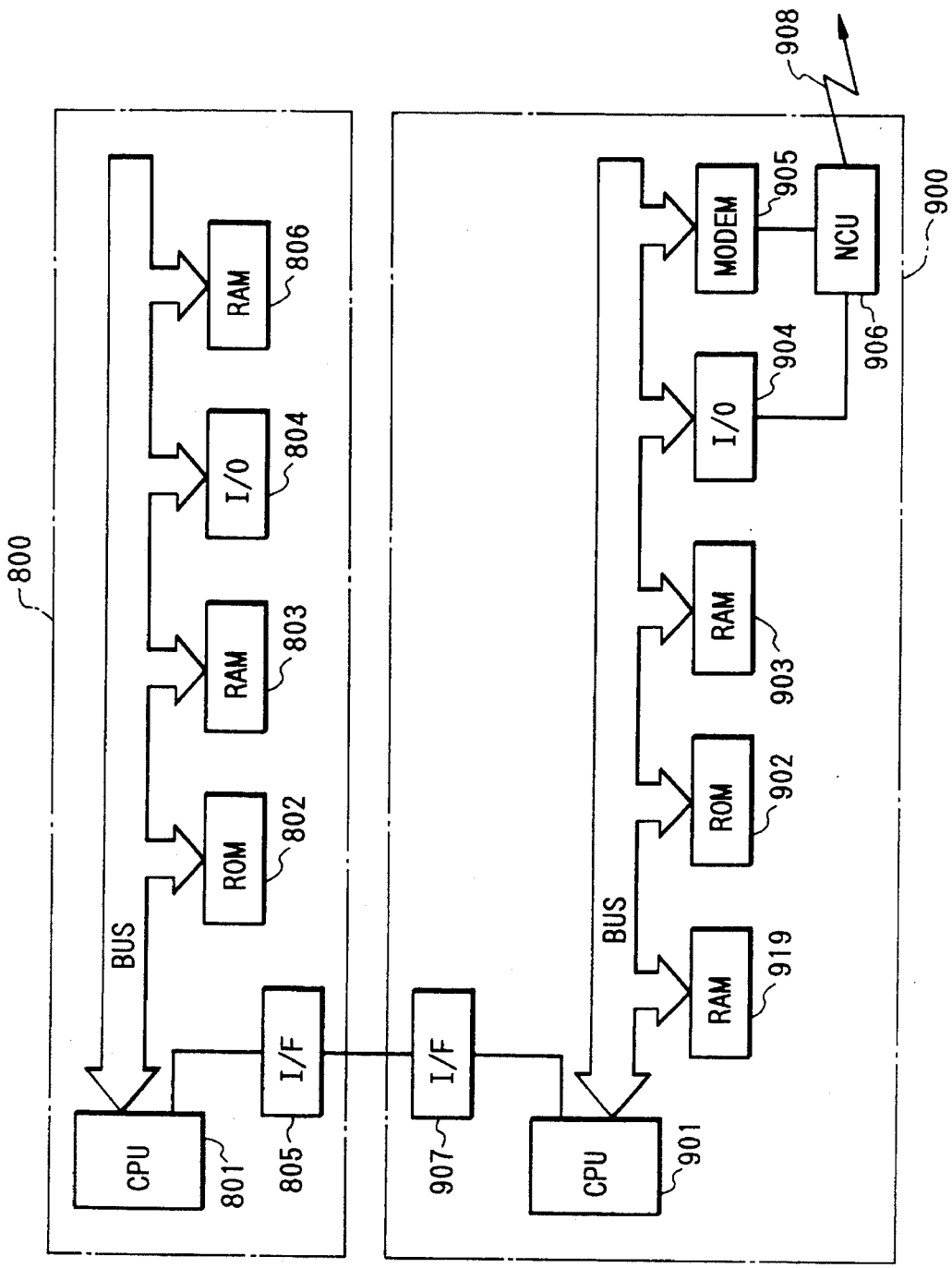
FIG. 9 is a block diagram of a copy controller 800 and a communication controller 900.

FIG. 9 is a block diagram for the copy controller 800 and the communication controller 900 in this embodiment.

801 to 805 are the same as those in FIG. 3.

806 is a RAM for storing the information necessary for controlling the communication with the external device.

901 to 908 are the same as those in FIG. 3.

919 is a RAM for storing the information necessary for controlling the copy operation.

In the above constitution, the countermeasure to be taken when the abnormality occurs in the stored control information will be described below.

The copying apparatus in this embodiment has four RAMs mounted in the copying apparatus main component 100, as shown in FIG. 9. Among them, the RAMs 803, 806 are mounted in the copy controller 800, and the remaining RAMs 903, 909 are mounted in the communication controller 900 for controlling the communication with the external device 999. The RAM 803 is used as a working area by the CPU 803 in controlling the operation of the copying apparatus main component, and the RAM 903 is used as a working area by the CPU 901 in controlling the communication with the external device.

Figure 10:
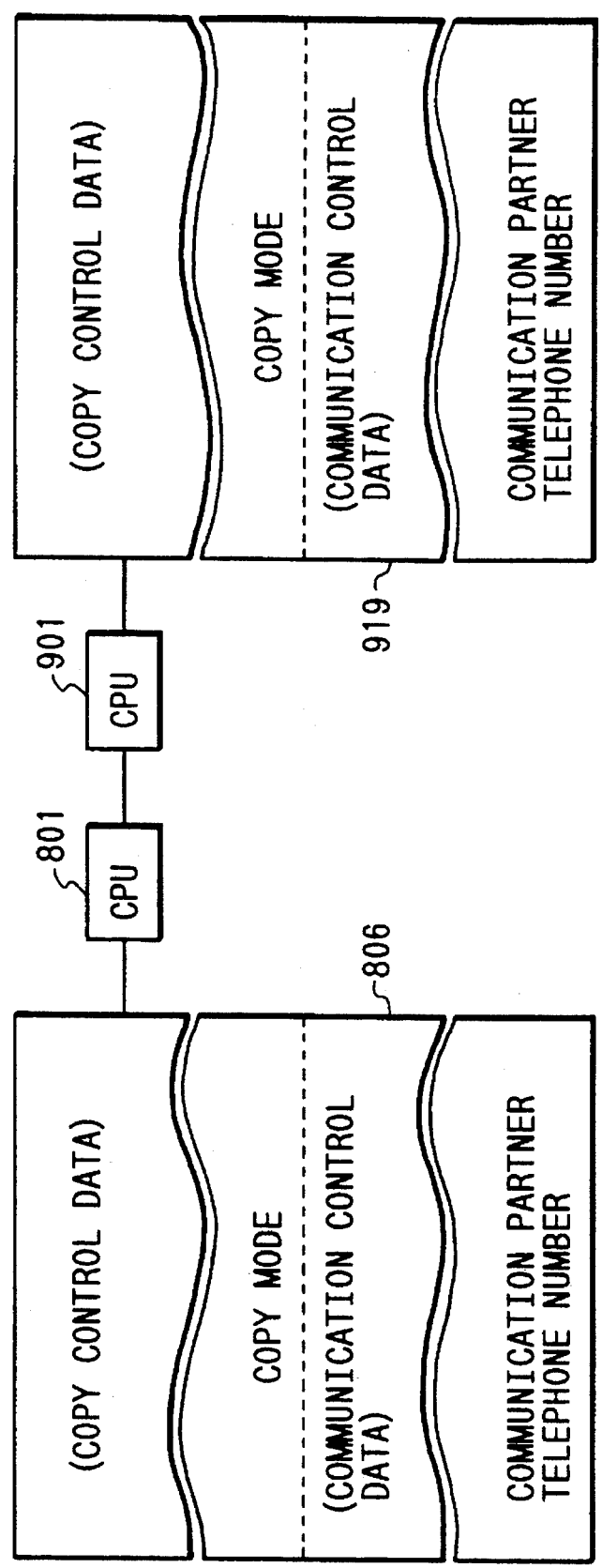
FIG. 10 is a view for explaining backup RAMs 806, 919.

The RAM 806 and the RAM 919 are backup RAMs, each RAM storing the information necessary for controlling the copying apparatus main component and the information necessary for controlling the communication with the external device, as shown in FIG. 10. The information necessary for controlling the copying apparatus main component is for example a copy mode registered by the user or a counter value for the copy number. On the other hand, the information necessary for controlling the communication is for example a telephone number of the communication partner or a communication time.

The contents of these two backup RAMs are always held identical via the CPU 801, the I/F 805, 907 and the CPU 901. Also, when the copying apparatus 100 is initiated, the data is transcribed from the RAM 806 to the RAM 803, and from the RAM 919 to the RAM 903, whereby the CPU 801 and the CPU 901 operate while referring to the RAM 803 and the RAM 903, respectively.

Figure 11:
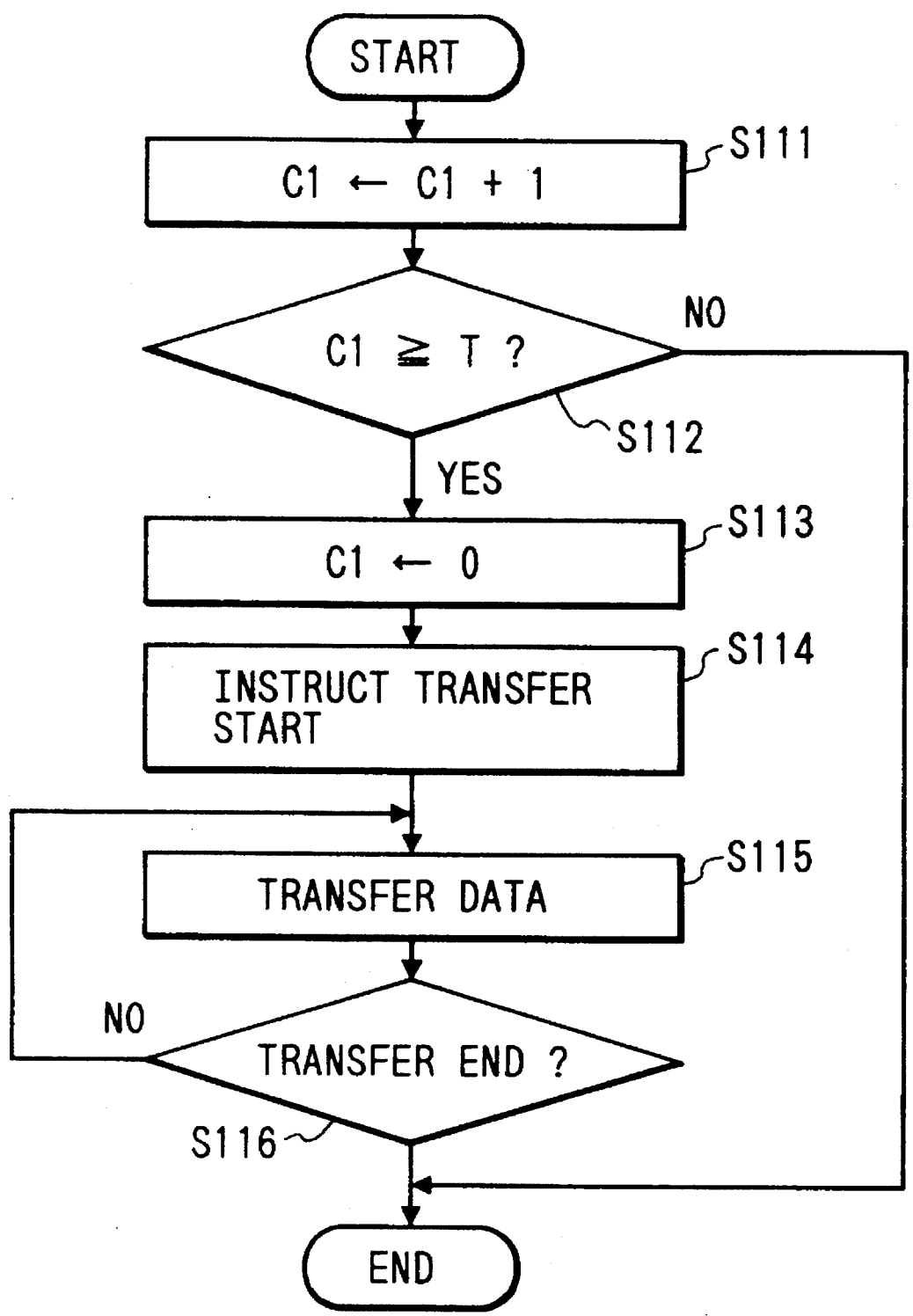
FIG. 11 is a flow chart of the data transfer between the backup RAMs 806, 919.

FIG. 11 is a flow chart for transferring the stored information. If the power supply of the copying apparatus main component is turned on, a task as shown in FIG. 11 is activated, and a processing as shown in FIG. 11 is executed in parallel with the control of the copying operation, until the power supply of the copying apparatus main component is shut off in a certain time interval.

First, 1 is added to a counter c1 (step S111). If the counter c1 reaches a certain value T (step S112), the counter c1 is cleared to zero (step S113), and the transfer operation is executed by issuing a transfer start instruction (steps S114, S115).

The transfer operation (steps S114, S115) are performed through the following processing procedure.

The CPU 801 informs the CPU 901 that the transfer of the contents for the backup RAM 806 is initiated. The CPU 901 stores all the data transferred from the RAM 806 of the copy controller 800, following the transfer start instruction, into the backup RAM 919 sequentially (step S115), until the transfer termination is informed (step S116).

With the same procedure as that of transferring the information stored in the RAM 806 to the RAM 919, the information stored in the backup RAM 919 of the communication controller 900 is transferred to the backup RAM 802 of the copy controller 800.

By repeating the above information transfer, the stored contents for the RAM 806 and the RAM 919 can be always held identical.

Figure 12:
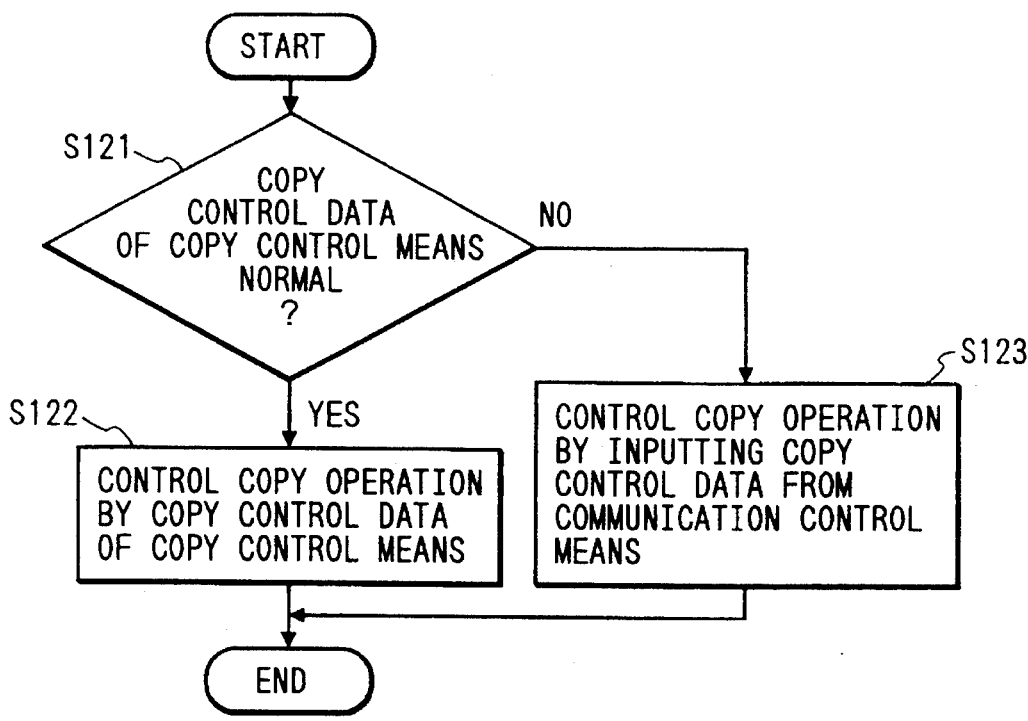
FIG. 12 is a control flow chart of the copying operation when the abnormality occurs in the backup RAM 806.

FIG. 12 is a copy operation control flow chart when the abnormality occurs in the backup RAM 806.

If the backup RAM 806 of the copy controller 800 is normal (step S121), the CPU 801 controls the normal copy operation with the information stored in the working RAM 803 (step S122). If the abnormality in the backup RAM 806 is detected at step S121, the CPU 801 stops temporarily the copy operation, and transfers the information necessary for the subsequent copy operation from the backup RAM 919 in the communication controller 900 to the working RAM 803 in the copy controller 800 (step S123).

That is, at step S123, the CPU 801 informs the CPU 901 of the start of transfer. The CPU 901 temporarily holds the communication control processing being performed at that time and transfers all the data in the RAM 919 to the copy controller 800. On the other hand, the CPU 801 transfers all the received data to a predefined area in the working RAM 803 of the copy controller 800.

If the transfer is completed, the CPU 901 restarts the communication operation, while the CPU 801 displays the abnormality of the backup RAM on a display panel 701 provided on the main component operation panel 600, and then continues the copy operation based on the data transferred to and stored in the RAM 803.

With the above control, it is possible to restore and restart readily the copy operation even if the abnormality occurs in the storage device of the copy control means.

Figure 13:
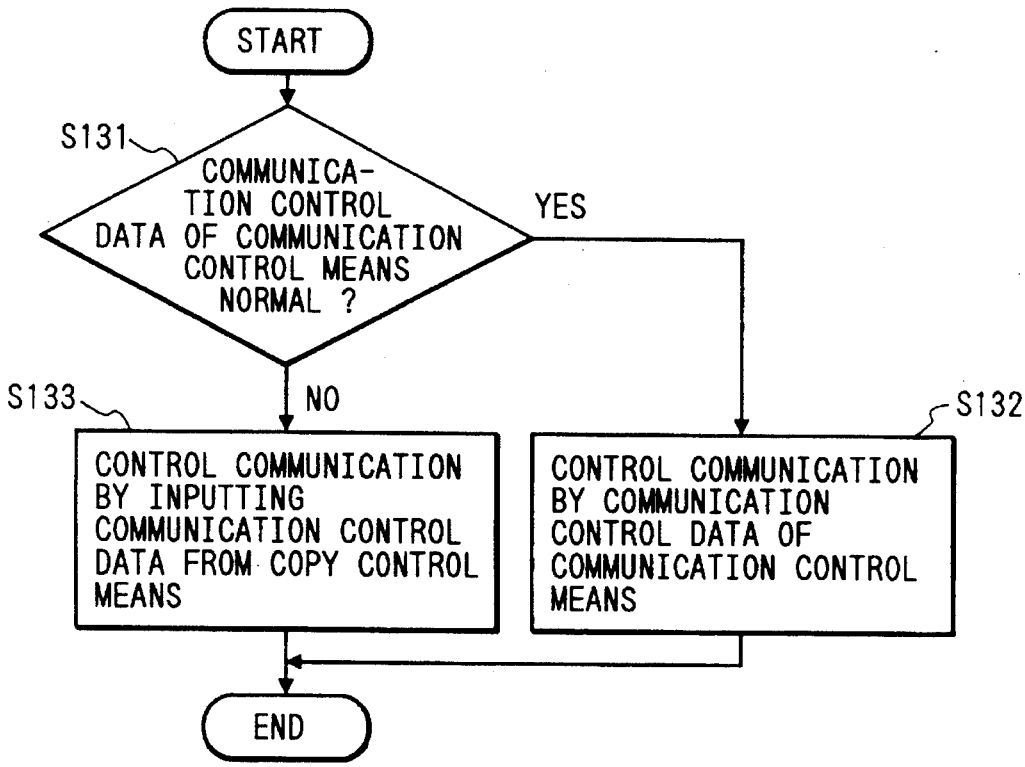
FIG. 13 is a communication control flow chart when the abnormality occurs in the backup RAM 919.

FIG. 13 is a communication control flow chart when the abnormality occurs in the backup RAM 919.

If the backup RAM 919 of the communication controller 900 is normal (step S131), the CPU 901 performs the normal communication control with the information stored in the working RAM 903 (step S132). If the abnormality in the backup RAM 919 is detected at step S131, the CPU 901 stops temporarily the communication operation, and transfers the information necessary for the subsequent communication operation from the backup RAM 806 to the working RAM 903 (step S133).

That is, at step S133, the CPU 901 informs the CPU 801 of the start of transfer. The CPU 801 temporarily holds the copy operation being performed at that time and transfers all the data in the RAM 806 to the communication controller 900. On the other hand, the CPU 901 transfers all the received data to a predefined area in the working RAM 903 of the communication controller.

If the transfer is completed, the CPU 901 restarts the communication operation, while the CPU 801 displays the abnormality of the backup RAM 919 in the communication controller on the display panel 701 provided on the main component operation panel 600, and then continues the copy operation.

With the above control, it is possible to restore and restart readily the communication operation even if the abnormality occurs in the storage device of the communication control means.

In this way, a plurality of storage means for storing the information as to the copy operation and the communication operation with the external device are arranged in a portion of communication control means for controlling the communication operation and a portion of copy control means for controlling the copy operation, respectively, so that the stored contents of their storage means are always held identical. And if one storage means fails due to some reason, the information stored in another storage means is transferred to the copy control means or the communication control means to continue the subsequent copy or communication operation, so that the operation can be readily restarted in a shorter time.

Also, in this invention, the possibility that all the storage means within the apparatus are disabled at the same time can be significantly reduced as compared with a conventional example in which storage means is disposed within the same controller, since storage means are disposed in copy control means and communication control means, respectively.

With the above feature, the probability in which the copy operation is interrupted will decrease so that the efficiency of the copy operation can be improved.

With respect to management and maintenance service, it is possible to expect a higher reliability on the information as to the working conditions of the copying apparatus installed in the user, and thus an improved, more effective management and maintenance service.

Another embodiment will be described below.

Figure 14:
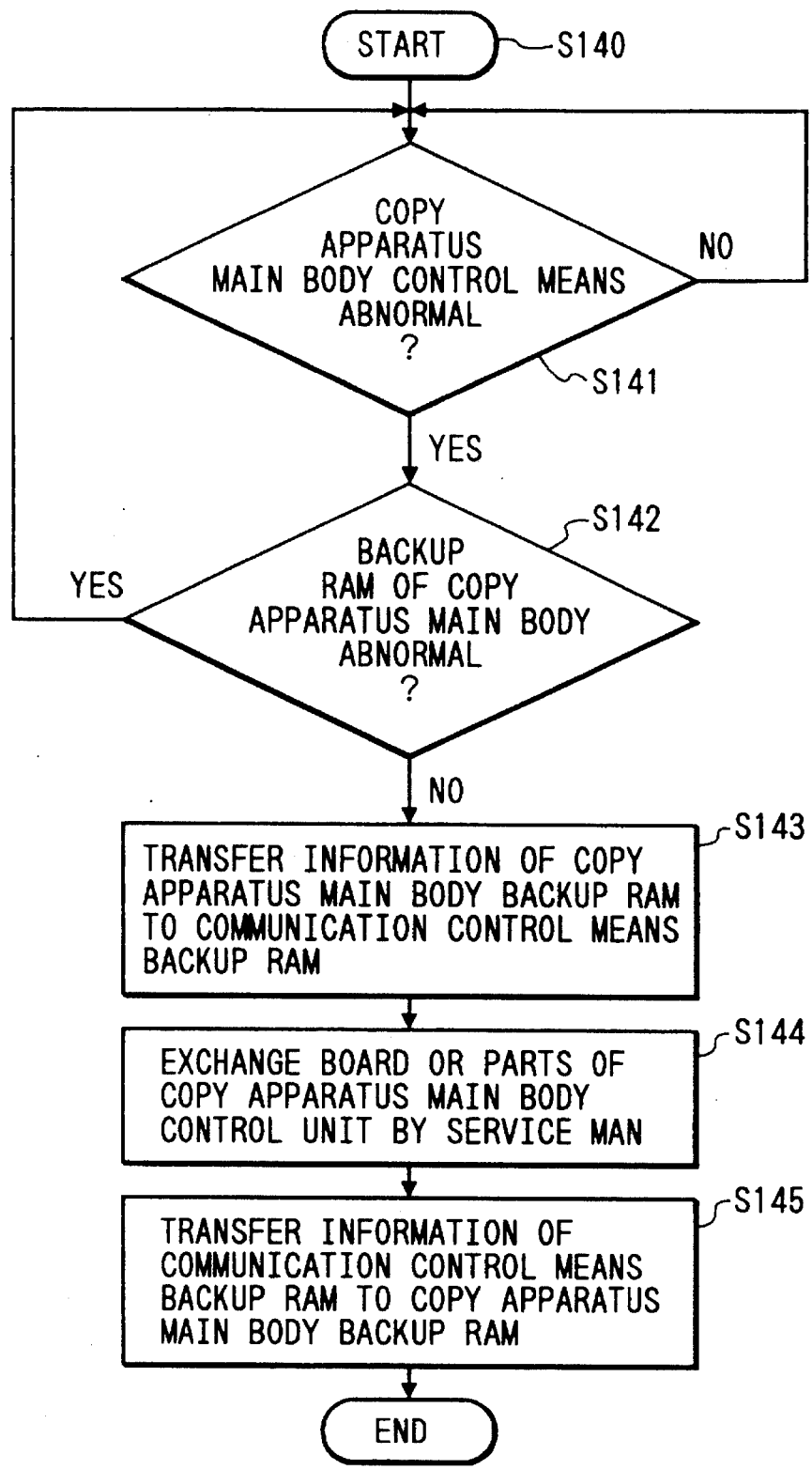
FIG. 14 is a control flow chart when the abnormality occurs in the copy controller 800.

FIG. 14 is a flowchart showing the operation when a failure occurs in the copy controller 800 of the copying apparatus as constituted in FIG. 9, except in the storage portion.

First, a check is made to determine whether the failure or abnormality except in the storage portion occurs in the copy controller 800 for controlling the copying apparatus (step 141). If there is no abnormality, the check at step 141 is repeated. If there is any abnormality at step 141, a check is made to determine whether the storage portion for storing the information as to the copying apparatus 100 is abnormal (step 142), and if it is abnormal, the check at step 141 is repeated.

If the decision is not made abnormal at step 142, the stored information is transferred from the backup RAM 806 in the copy controller 800 for storing the information as to the copying apparatus 100 to the backup RAM 919 in the communication controller 900 (step 143).

After a board or a part in the copy controller 800 of the copying apparatus is exchanged by the serviceman (step 144), the information is transferred from the backup RAM 919 of the communication controller 900 to the backup RAM 806 of the copy controller exchanged (step 145), and the operation is ended.

With the above operation, since the information as to the copying apparatus stored in the backup RAM 806 of the copy controller 800 is once transferred to the backup RAM 919 of the communication controller 900, it is unnecessary for the serviceman to write and input manually that information into the backup RAM 806 of the copy controller 800, so that the information can be rapidly and securely input again, without input mistakes, leading to an easier and more effective management and maintenance.

Another embodiment will be described below.

Figure 15:
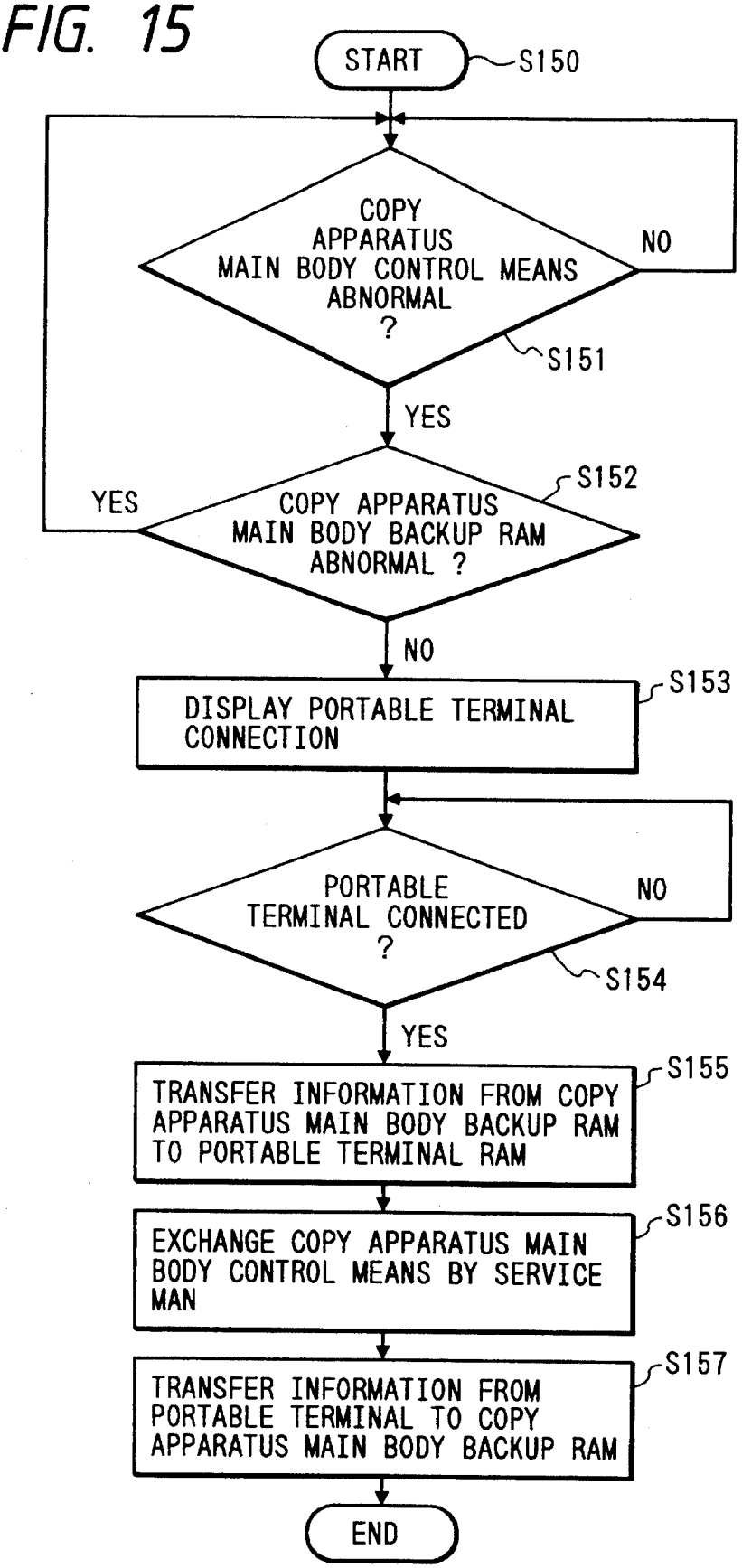
FIG. 15 is a control flow chart when the abnormality occurs in the copy controller 800.

FIG. 15 is a flowchart showing the operation when a failure occurs except in the storage portion within the controller in an instance in which the stored information is transferable between the storage portion for storing the information as to the copying apparatus in the controller of the copying apparatus and the storage portion provided in a portable terminal which can be transported.

First, a check is made to determine whether a failure or abnormality occurs in the copy controller 800 for controlling the copying apparatus, except in the storage portion (step 151). If there is no abnormality, the check at step 151 is repeated. If there is any abnormality at step 151, a check is made to determine whether the abnormality occurs in the storage portion for storing a plurality of informations as to the copying apparatus (step 152). If there is any abnormality, the operation proceeds to step 151.

If there is no abnormality at step 152, a message of connecting the portable terminal (not shown) is displayed on the copying apparatus main component (step 153). Then a check is made to determine whether the portable terminal is connected (step 154), and if it is not, the check is repeated. If it is determined to be connected, the information as to the copying apparatus is transferred from the backup RAM 806 or 919 of the copying apparatus to the storage portion of the portable terminal connected thereto (step 155). And if the copy controller 800 or the communication controller 900 of the copying apparatus is exchanged by the serviceman (step 156), a plurality of informations as to the copying apparatus are transferred and input into the backup RAM 806 or 919 of the copying apparatus main component from the portable terminal (step 157), and the operation is ended.

In this embodiment, it is unnecessary to provide storage means for storing the information as to the copying apparatus on the communication control means, so that the constitution and the normal control of the copying apparatus main component can be made simpler and more effective allowing the input of the information in exchanging the controller to be made more rapidly and securely.

Another embodiment will be described below.

Figure 16:
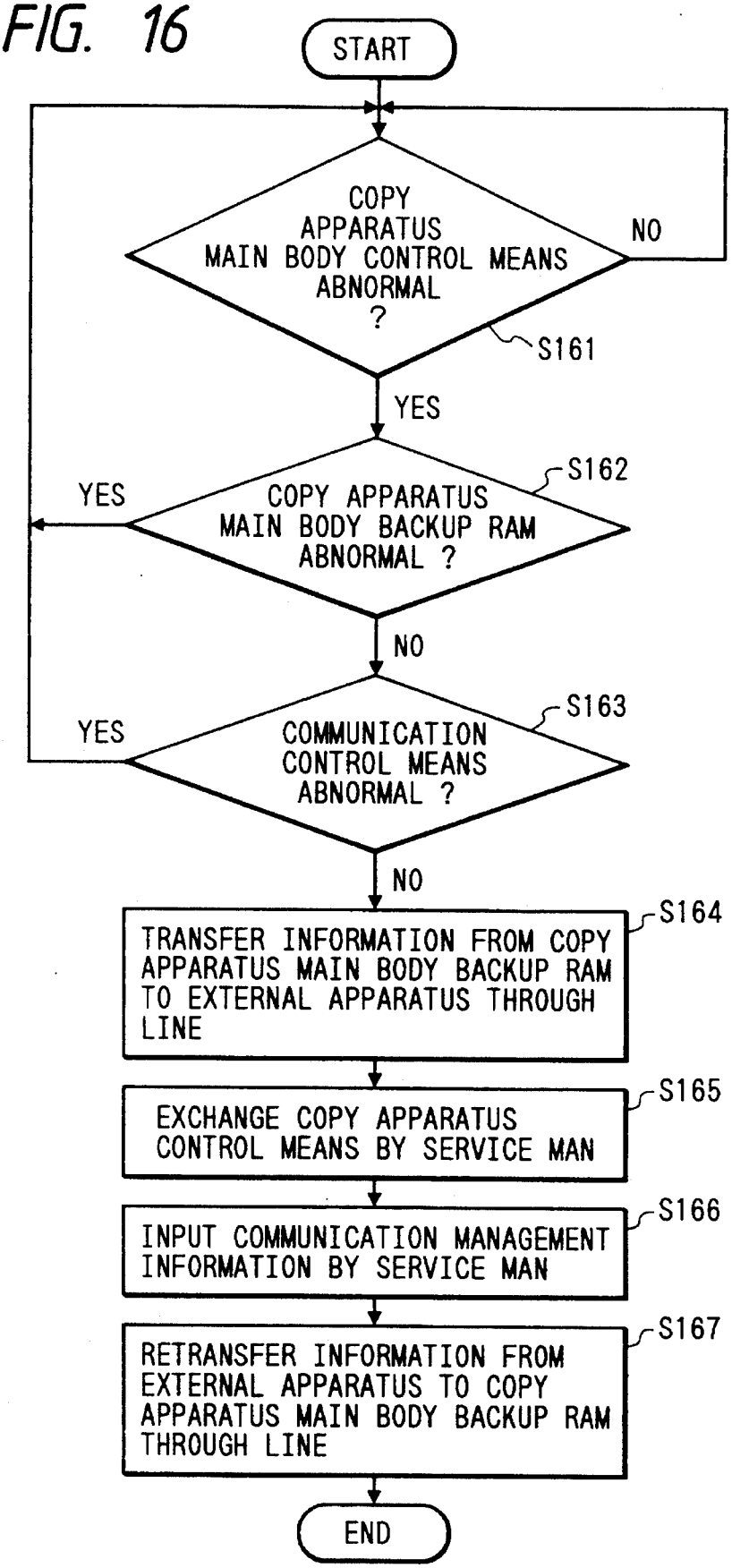
FIG. 16 is a control flow chart when the abnormality occurs in the copy controller 800.

FIG. 16 is a flow chart showing the operation when a failure occurs except in the storage portion within the controller for controlling the copying apparatus in an instance in which there is provided a storage portion for storing the information as to the copying apparatus, and the stored information is transferable to the external device through the communication controller.

First, a check is made to determine whether a failure or abnormality occurs in the copy controller 800 for controlling the copying apparatus, except in the storage portion (step 161). If there is no abnormality, the check at step 161 is repeated. If there is any abnormality at step 161, a check is made to determine whether the abnormality occurs in the storage portion for storing the information as to the copying apparatus (step 162). If there is any abnormality, the operation returns to step 161.

If there is no abnormality at step 162, a check is made to determine whether the communication controller 900 for communicating with the external device 999 is abnormal (step 163). If it is abnormal, the operation returns to step 161. If it is not abnormal at step 163, the information of the storage portion in the copying apparatus is transferred via the external communication line to the external device 999 by the communication controller 900 (step 164). If the copy controller 800 or the communication controller 900 of the copying apparatus is exchanged by the serviceman (step 165), the communication control information such as the telephone number is input (step 166), and the stored information is again transferred to the backup RAM 806 or 919 for storing the information as to the copying apparatus in the copy controller or the communication controller 900 which has been exchanged (step 167), and the processing at the failure is ended.

In this embodiment, it is also possible to input the information again more easily and securely as in the previous embodiment, by transferring the stored information between storage means for storing the information as to the copying apparatus and the storage portion provided in the external device via the communication line.

Note that the present invention is also applicable to the printer, FAX or image file. The above described embodiments may be used in combination.

In this way, since there is provided storage means for storing the information as to the copying apparatus, it is possible to input again by once transferring the stored information of storage means normally operated to another storage medium with transfer means, when a part of the copying apparatus fails, without the necessity of manually inputting the stored information again, unlike the conventional example, so that it is possible to reproduce the stored information securely with a simpler operation, leading to more appropriate and rapid management and maintenance, a reduced down time and an improved reliability.

What is claimed is:

1. An equipment control unit comprising:

equipment control means for controlling operation of an equipment;

first storage means for storing data, said first storage means being accessed by said equipment control means;

communication control means for controlling transmission and reception of data to and from an external device;

second storage means for storing data, said second storage means being accessed by said communication control means; and transfer means for transferring the data between said equipment control means and said communication control means, wherein said communication control means receives data from said equipment control means through said transfer means in response to a reception request, so as to be written into said second storage means, transmits the data stored in said second storage means to the external device in response to a transmission request, receives data from the external device in response to a reception request so as to be written in said second storage means, and transmits data stored in said second storage means to the equipment control means through said transfer means in accordance with whether transmission is possible.

2. The equipment control unit according to claim 1, wherein communication speed between said equipment control means and said communication control means is different from that between said communication control means and said external device.

3. The equipment control unit according to claim 1, wherein communication between said control means and said communication control means can be performed at the timing independent of that between said communication control means and said external device.

4. The equipment control unit according to claim 1, wherein the equipment is an image forming apparatus for forming an image on a recording medium.

5. The equipment control unit according to claim 1, wherein said communication control means transmits or receives data via a communication line.

6. An equipment control unit comprising:

first storage means for storing data;

equipment control means for controlling operation of an equipment based on the data stored in said first storage means;

second storage means for storing data;

communication control means for controlling transmission and reception of data to and from an external device based on the data stored in said second storage means; and data transfer means for holding identical contents of said first storage means and said second storage means.

7. The equipment control unit according to claim 6, wherein said data transfer means transfers the data of said first storage means to said second storage means periodically.

8. The equipment control unit according to claim 6, wherein said data transfer means transfers the data of said second storage means to said first storage means periodically.

9. The equipment control unit according to claim 6, wherein said equipment is an image forming apparatus for forming an image on a storage medium.

10. The equipment control unit according to claim 6, wherein said data transfer means transfers the data from said first storage means to said second storage means when an abnormality occurs in said second storage means.

11. The equipment control unit according to claim 6, wherein said data transfer means transfers the data from said second storage means to said first storage means when an abnormality occurs in said first storage means.

12. The equipment control unit according to claim 6, wherein said communication means communicates via a communication line.

13. An equipment control unit comprising:

first storage means for storing data;

equipment control means for controlling operation of an equipment based on the data stored in said first storage means;

second storage means for storing data; and communication control means for controlling transmission and reception of data to and from an external device based on the data stored in said second storage means, wherein said communication control means stores in the second storage means data for the equipment control means received from the equipment control means and transmits data for the equipment control means stored in the second storage means to the equipment control means.

14. An equipment control unit comprising:

first storage means for storing data;

equipment control means for controlling operation of an equipment based on the data stored in said first storage means;

second storage means for storing data; and communication control means for controlling transmission and reception of data to and from an external device based on the data stored in said second storage means, wherein said equipment control means stores in the first storage means data for the communication control means received from the communication control means and transmits data for the communication control means stored in the first storage means to the communication control means.

15. A communication control unit comprising:

transfer means for bidirectionally transferring data between an equipment control unit and said communication control unit;

communication means for bidirectionally communicating the data between an external device and said communication control unit; and control means for performing reception of data from the equipment control unit through said transfer means in response to a reception request, performing transmission of the data received through said transfer means to the external device through said communication means in response to a transmission request, performing reception of data from the external device through said communication means in response to a reception request, and performing transmission of data received through said communication means to the equipment control unit through said transfer means in accordance with whether transmission is possible.

16. A communication control unit according to claim 15, wherein said control means receives the data through said transfer means in response to a reception request from the equipment control unit.

17. A communication control unit according to claim 15, wherein said control means receives the data through said transfer means in response to a reception request from the external device.

18. A communication control unit according to claim 15, wherein communication speed between the equipment control unit and said communication control unit is different from that between said communication control unit and the external device.

19. A communication control unit according to claim 15, wherein communication between the equipment control unit and said communication control unit can be performed at a timing independent of that between said communication control unit and the external device.

20. A communication control unit according to claim 15, wherein the equipment control unit controls an image forming apparatus for forming an image on a recording medium.

21. A communication control apparatus comprising:

storage means for storing data; and communication means for performing communication between an equipment control apparatus and an external apparatus, wherein said communication means receives control data for controlling the equipment control apparatus from the equipment control apparatus, and said storage means stores the received control data.

22. A communication control unit according to claim 21, wherein the equipment control apparatus controls an image forming apparatus for forming an image on a recording medium.

23. A communication control unit according to claim 21, wherein said communication means transmits the control data stored in said storage means to the equipment control apparatus in accordance with occurrence of an abnormality in a storage unit in the equipment control apparatus.

24. A communication control unit according to claim 23, wherein said storage unit stores control data for controlling the equipment control apparatus.

25. An equipment control apparatus comprising:

control means for controlling a piece of equipment;

storage means for storing data; and communication means for performing communication with a communication control apparatus for performing communication between said equipment control apparatus and an external apparatus, wherein said communication means receives control data for controlling the communication control apparatus, and said storage means stores the received control data.

26. A communication control unit according to claim 25, wherein the equipment is an image forming apparatus for forming an image on a recording medium.

27. A communication control unit according to claim 25, wherein said communication means transmits the control data stored in said storage means to the communication control apparatus in accordance with occurrence of an abnormality in a storage unit in the communication control apparatus.

28. A communication control method comprising the steps of:

transferring data bidirectionally between an equipment control unit and a communication control unit, via a transfer means;

communicating the data bidirectionally between an external device and the communication control unit; and performing reception of data from the equipment control unit through the transfer means in response to a reception request, performing transmission of the data received through the transfer means to the external device through the communication means in response to a transmission request, performing reception of data from the external device through said communication means in response to a reception request, and performing transmission of data received through the communication means to the equipment control unit through the transfer means in accordance with whether transmission is possible.

29. A communication control method according to claim 28, wherein said performing step includes receiving the data through the transfer means in response to a reception request from the equipment control unit.

30. A communication control method according to claim 28, wherein said performing step includes receiving the data through the transfer means in response to a reception request from the external device.

31. A communication control method according to claim 28, wherein communication speed between the equipment control unit and the communication control unit is different from that between the communication control unit and the external device.

32. A communication control method according to claim 28, wherein communication between the equipment control unit and the communication control unit can be performed at a timing independent of that between the communication control unit and the external device.

33. A communication control method according to claim 28, wherein the equipment control unit controls an image forming apparatus for forming an image on a recording medium.

34. A communication control method comprising the steps of:

performing communication between an equipment control apparatus and an external apparatus, wherein said performing step includes receiving control data for controlling the equipment control apparatus from the equipment control apparatus; and storing the received control data, wherein said performing step includes transmitting the control data stored in said storing step to the equipment control apparatus in accordance with occurrence of an abnormality in a storage unit in the equipment control apparatus.

35. A communication control method according to claim 34, wherein the equipment control apparatus controls an image forming apparatus for forming an image on a recording medium.

36. A communication control method according to claim 34, wherein said storing step includes storing control data for controlling the equipment control apparatus.

37. A communication control method comprising the steps of:

controlling a piece of equipment;

storing data; and performing communication with a communication control apparatus for performing communication between an equipment control apparatus and an external apparatus, wherein said performing step includes receiving control data for controlling the communication control apparatus, and said storing step includes storing the received control data, and wherein said performing step includes transmitting the control data stored in said storing step to the communication control apparatus in accordance with occurrence of an abnormality in a storage unit in the communication control apparatus.

38. A communication control method according to claim 37, wherein the equipment is an image forming apparatus for forming an image on a recording medium.

* * * * *

UNITED STATES PATENT AND TRADEMARK OFFICE
CERTIFICATE OF CORRECTION

PATENT NO. : 5,488,454

DATED : January 30, 1996

INVENTOR(S): TAISEI FUKADA ET AL.

It is certified that error appears in the above-identified patent and that said Letters Patent is hereby corrected as shown below:

On the title page:
AT [56] REFERENCES CITED

U.S. Patent Documents,
    "3,623,013  11/1991  Perkins et al." should read
    --3,623,013  11/1971  Perkins et al.--.

COLUMN 4

Line 63, "external" should read -external device 999--.

COLUMN 6

Line 19, "two" should read --two- --.

COLUMN 9

Line 45, "CPU 803" should read --CPU 801--.

COLUMN 14

Line 10, "control means" should read
        --equipment control means--.

UNITED STATES PATENT AND TRADEMARK OFFICE
CERTIFICATE OF CORRECTION

PATENT NO. : 5,488,454

DATED : January 30, 1996

INVENTOR(S) : TAISEI FUKADA ET AL.

It is certified that error appears in the above-identified patent and that said Letters Patent is hereby corrected as shown below:

COLUMN 15

Line 62, "apparatus" should read --unit--.

COLUMN 16

Line 16, "apparatus" should read --unit.

Signed and Sealed this

Thirtieth Day of July, 1996

Attest:

BRUCE LEHMAN

Attesting Officer — Commissioner of Patents and Trademarks